Feb. 27, 1934.  E. DE LAGABBE  1,949,041
EXHAUST SILENCER
Filed Dec. 26, 1929   3 Sheets-Sheet 3
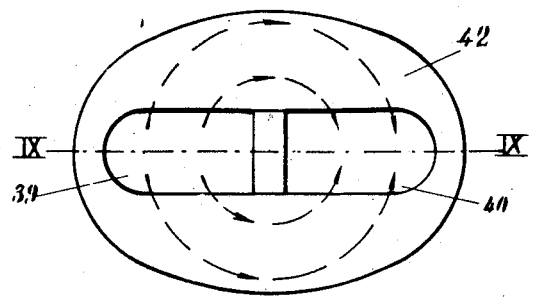
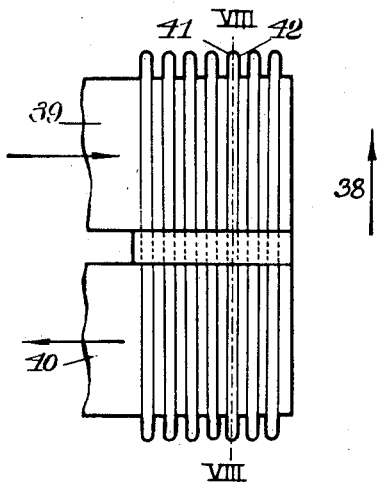
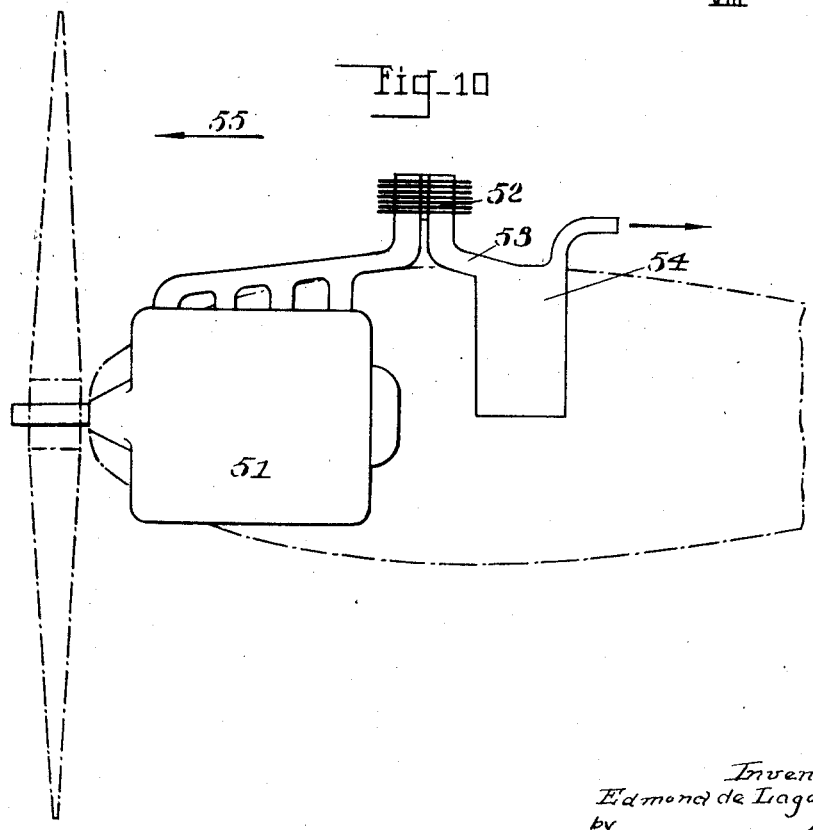
Inventor:-
Edmond de Lagabbe Patented Feb. 27, 1934

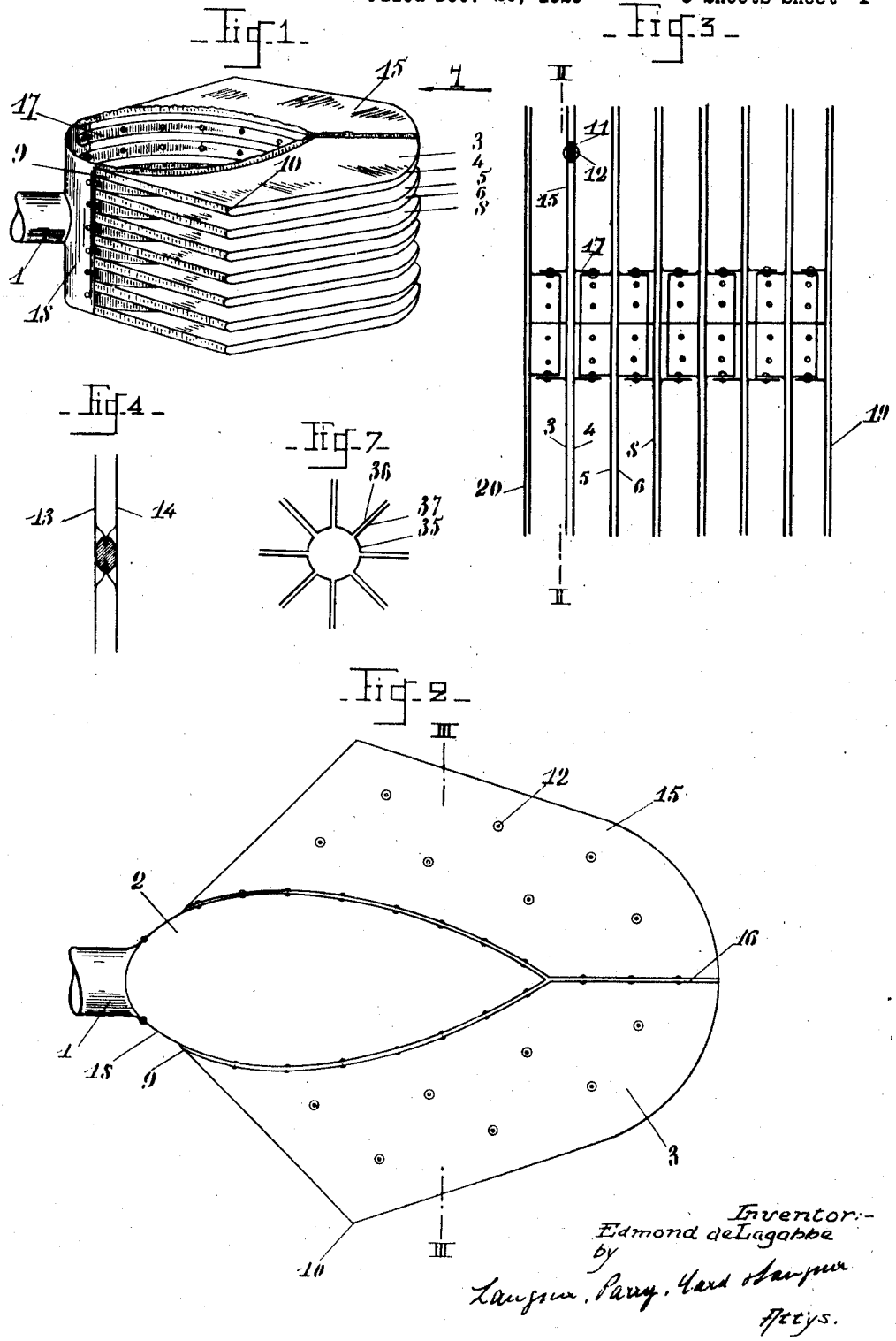

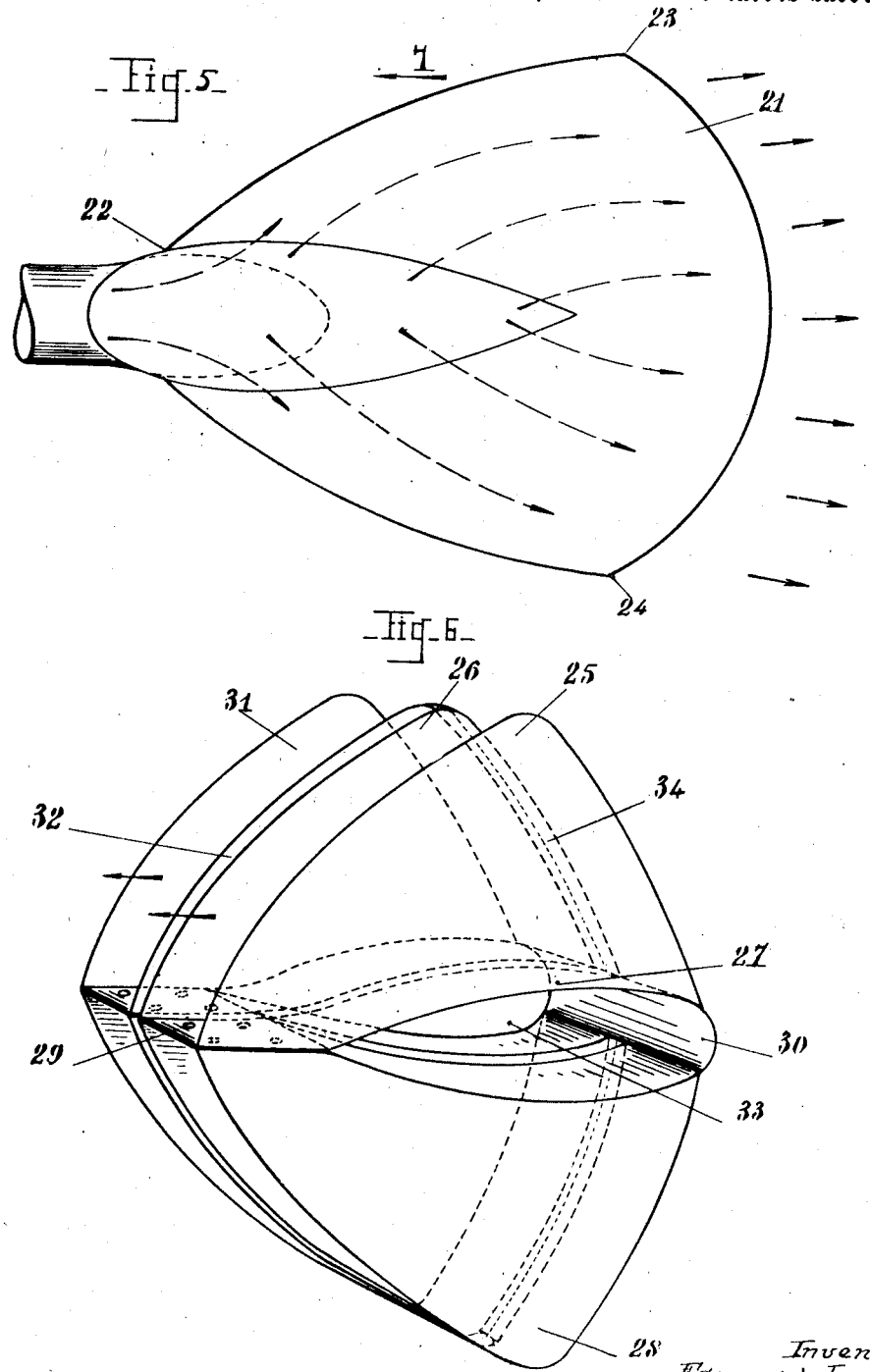

1,949,041

UNITED STATES PATENT OFFICE 1,949,041

EXHAUST SILENCER

Edmond de Lagabbe, Paris, France

Application December 26, 1929, Serial No. 416,589
In France December 28, 1928

1 Claim. (Cl. 137—160)

The present invention relates to an apparatus for preventing the flame and for reducing the noise caused by the exhaust of internal combustion engines, especially aircraft engines.

The invention consists in circulating the exhaust gas between closely spaced parallel plates whose outer surface is in contact with a cooling fluid such as air. This affords a reduction of the volume of the gas, and the speed of flow is thus reduced. The cooling action is such that all flames are eliminated. The closely spaced plates also aid in damping the acoustic waves.

When mounted upon aircraft or vehicles, the said apparatus is preferably placed so that its axis extends along the direction of the wind created by the movement of the vehicle, and the said plates are parallel to the direction of the air streams.

In an improved apparatus the exhaust gas enters a main conduit, preferably of streamline form, whose axis is perpendicular to the direction of travel. The gas escapes into the air after having been formed into flat streams between the parallel plates. Such plates are preferably disposed in such manner that the resultant of the thrust of the escaping gas upon the air will be exercised in a direction contrary to the resistance to the forward motion of the vehicle interposed by the silencer or muffler, so that the two reactions counteract and neutralize each other. The gas issues in the form of thin sheets having a large surface of contact with the air, and thus the air is drawn forward by friction, so that the gas will assure the circulation of the air when the aircraft is stationary, and will also further such circulation during flight.

The apparatus may be placed in the path of the exhaust pipe by the use of a main intake conduit and a main outlet conduit, and when the gas flows from one conduit to the other it is formed into flat streams by the parallel plates.

In another construction, a main conduit may be used whose axis is parallel to the direction of the wind, and the plates may be radially disposed about the said conduit, and in such construction the plates are still parallel to the wind.

By way of example, and for the proper understanding of the description, the accompanying drawings show various embodiments of the invention.

Figure 1 is a perspective view of a silencer constructed in conformity to the invention, in which the upper part is shown in section on the line II—II of Figure 3, with parts broken away.

Figure 2 is a corresponding plan view, with a section on the line II—II of Figure 3.

Figure 3 is a section on the line III—III of Figure 2.

Figure 4 is a detail view showing the cross-bracing of the parallel plates.

Figure 5 is a plan view of a modification.

Figure 6 is a perspective view of another construction of the parallel plates.

Figure 7 is a sectional view of a silencer in which the parallel plates have the radial position on the main conduit.

Figure 8 is a vertical section of a silencer placed in the path of the engine exhaust pipe.

Figure 9 is the corresponding plan view, with the section on the line IX—IX of Figure 8.

Figure 10 is a diagrammatic plan view of a plant installed upon an aircraft.

In the construction shown in Figures 1, 2, and 3, the gas delivered from the engine to the pipe 1, proceeds into a main conduit 2 and escapes into the air after having been formed into flat streams in the narrow space between plates such as 3 and 4, 5 and 6, etc.

On the other hand, the apparatus being disposed along the axis indicated by and the vehicle moving in the direction of the arrow 7, a strong current of air flows in the spaces between the plates 4—5, 6—8, etc.

The main conduit 2 is spindle shaped, in order to reduce its resistance to the air. The said plates have such form that the resultant of the thrust of the escaping gas upon the air is in a direction contrary to that of the resistance to the forward motion of the vehicle interposed by the plates themselves.

The plates 3—4 consist of a single sheet metal member folded on itself along the line 9—10. The parts 3 and 4 are held in the parallel position at a small distance from each other by cross-pieces consisting of washers such as 11 (Figure 3) secured by rivets 12. Figure 2 shows the distribution of such cross-pieces.

It is also feasible to avoid the use of washers by stamping in each plate small bosses which are connected together by a rivet or by soldering. This arrangement is shown in Figure 4, the plates 13 and 14 being thus connected.

The plates 3 and 15 are joined in pairs by a row of rivets 16, thus forming an element. Such elements are piled up and are joined by riveting the bent edges such as 17. A suitably curved piece of sheet metal 18 is riveted or soldered to the extreme front part of the bent ends of all the plates. The ends are closed by flat sheet metal members such as 19—20. The main central conduit, into which the pipe 1 discharges, thus has its walls formed by the sheet 18 and by the bent edges 17 of all the plates; said ends are closed by the members 19—20, so that the gas can only escape by flowing through the spaces between the plates 3—4, 5—6, etc. The gas delivery conduit might also open upon one of the ends 19—20.

In the construction shown in Figure 5, the plates 21 are joined by clasps or soldering at the edges 22—23. The gas follows the path shown by the arrows, and it issues at the edge 23—24. Since the apparatus moves in the direction of the arrow 7, the direction of the escaping air streams is practically parallel to the direction of travel.

Figure 6 shows a construction analogous to Figure 3. A metal plate is cut and stamped so as to form two flanges 25—26 joined by a curved part 27. An element is formed by joining said plate to a like plate 28 by rivets 29 and by means of the suitably bent sheet 30, which is soldered or riveted to the front edge of the part 27. A certain number of such elements are placed together, a second element 31 being shown in the figure, leaving between them a space 32 for the escape of the gas brought to the main conduit 33. At the front part, at 34, the flanges of one element are joined to those of the next element by their bent edges which are placed together and are held by soldering, by clasps, or the like.

Figure 7 is a section on a plane perpendicular to the main conduit 35, which is parallel to the direction of the air streams. The gas escapes by passing between the closely spaced plates 36—37 which are radially disposed at the periphery of the main conduit. The said conduit may be formed by the bent edges of the elements 36—37, or by the curved surfaces of the elements which are not parallel but radial. Said plates are strongly cooled by the air flowing between the plates.

The apparatus shown in Figures 8 and 9 is adapted for use upon the exhaust pipe. The air streams follow the path shown by the arrow 38; Figure 9 shows the position of the apparatus in the wind. This device comprises two main conduits of suitable outline which are placed together; the gas enters at the conduit 39 and issues from the conduit 40. When proceeding from one conduit to the other, the gas is obliged to flow between the parallel plates, which are closely spaced, such as 41 and 42, following the path indicated by the arrows in Figure 8. Said plates may consist of sheets assembled at their edges by clasps or by soldering. The outer surface of said plates is properly cooled by the current of air flowing in the direction of the arrow 38.

Figure 10 shows at 51 the aircraft engine, and upon the exhaust pipe is disposed an apparatus comprising plates 52 analogous to what is shown in Figures 8 and 9. The plates are parallel to the direction of the air streams, with the airplane traveling in the direction of the arrow 55.

In the apparatus 52, the gases are well cooled and are formed into flat streams, and their volume thus diminishes. They are then discharged and reach, through the pipe 53, a muffler 54 analogous to what is currently employed upon motor vehicles. This may consist simply of a chamber of sufficient size which is properly partitioned, and it may be disposed in the airplane body, by reason of the low temperature of the gas flowing through it. Due to this reduced temperature, it can be made of a light metal such as duralumin metal or magnesium, without inconvenience.

As an example, good results have been obtained by disposing on each set of six cylinders of a 12 cylinder 500 HP engine, an apparatus having the following features:

| | |
|---|---|
| Number of pairs of plates | 11 |
| Maximum diameter of plates mm | 400 |
| Total width of the plates mm | 225 |
| Diameter of the intake conduit mm | 120 |
| Diameter of the offtake conduit mm | 90 |
| Volume of the chamber disposed after each apparatus cubic decimeters | 40 |

Having now particularly described and ascertained the nature of my invention and in what manner the same is to be performed, I declare that what I claim is:

Apparatus for treating exhaust gases of internal combustion engines, comprising a first collector for the inlet of the gas, a plurality of pairs of closely spaced parallel plates disposed perpendicularly to the axis of the said collector and maintaining a constant spacing between each other, the space between the plates of each pair of plates being in communication with the said collector, a wall between the two plates of each pair of plates to prevent the passage of air between the said plates, walls between the pairs of plates to prevent the passage of gas between the said pairs of plates, and a second collector substantially parallel to the said first collector for the departure of the gas, each plate being thus traversed by two orifices, one for the entrance and one for the departure of the gas, the walls between the two plates of each pair of plates being continuous and creating air-tight compartments.

EDMOND DE LAGABBE.